United States Patent [19]

Jones

[11] 4,104,289

[45] Aug. 1, 1978

[54] FILLED THERMOPLASTIC RESIN COMPOSITIONS

[75] Inventor: Giffin D. Jones, Midland, Mich.

[73] Assignee: The Dow Chemical Company, Midland, Mich.

[21] Appl. No.: 724,888

[22] Filed: Sep. 20, 1976

[51] Int. Cl.² ............................................. C08K 5/34
[52] U.S. Cl. ............................ 260/42.41; 260/42.16; 260/42.29; 260/42.42; 428/407
[58] Field of Search ............... 260/42.41, 42.42, 42.16, 260/42.29; 428/407

[56] References Cited

U.S. PATENT DOCUMENTS

| | | | |
|---|---|---|---|
| 3,272,772 | 9/1966 | Russell | 260/42.46 |
| 3,650,814 | 3/1972 | Elder | 428/407 |
| 3,817,851 | 6/1974 | Atchison et al. | 204/159.17 |

*Primary Examiner*—James H. Derrington
*Attorney, Agent, or Firm*—Lester J. Dankert

[57] ABSTRACT

Curable filled thermoplastic resin compositions of polymer resin such as high density polyethylene, fillers such as calcium carbonate, and trivinylisocyanurate are curable under free-radical initiating conditions to cured compositions having unexpectedly increased tensile properties and toughness together with expected greater stiffness.

10 Claims, No Drawings

FILLED THERMOPLASTIC RESIN COMPOSITIONS

BACKGROUND OF THE INVENTION

It is known that the incorporation of solid inorganic fillers into solid olefin polymers increases their rigidity. For example, polyethylene compositions containing finely divided silica, glass fiber, talc, asbestos, calcium carbonate or the like are stiffer than the base polyethylene resin. But such filled compositions are also known to be more brittle, have lower impact strength, lower tensile strength and are less tough.

Numerous proposals have been suggested in the art to avoid such deleterious effects of filler addition, generally by particularly selecting and specifying the plastic component or the filler component or both, or by particularly treating the filler or the starting plastic or the filled composition.

For example, in Japanese Patent Publication No. 7894/1972 (published Mar. 6, 1972 from Application No. 69212/1967 filed Oct. 29, 1967), Aishima et al. compound thermoplastic olefinic polymers with inorganic fillers which are oxides, hydroxides or carbonates in the presence of monomeric acrylic acid or methacrylic acid, or their metal salts, or mixtures of such metal salts and a vinylic monomer containing an ester group. In U.S. Pat. No. 3,694,403, Aishima et al. in a related development describe using certain specified magnesium carbonates as filler with an unsaturated carboxylic acid as optional component improving impact resistance.

In U.S. Pat. No. 3,802,913, MacKenzie describes a curable composition comprising an ethylene polymer, a curing agent and a filler that is treated with an organosilane, e.g., vinyl silane.

In British Specification 1,195,214 published June 17, 1970, Bixler and Fallick describe reinforcing fillers for organic polymer compositions prepared by compounding a non-reinforcing filler with (a) an ethylenically unsaturated organic compound having chemical affinity for the surface of such filler, (b) an organic compound having at least two polymerizable ethylenic linkages in the molecule and (c) a free-radical generator, in specified proportions. Organic polymer compositions of such treated fillers are said to be characterized by increased toughness. In U.S. Pat. No. 3,272,772, Russell describes improved fillers for chlorinated high density polyethylene wherein the fillers are treated with polymerizable polar vinyl monomers which are monoethylenically unsaturated.

However, despite these and other disclosures of the prior art, it would still be desirable to provide highly filled thermoplastic compositions with improved properties, especially compositions of polyethylene, e.g., high density polyethylene, and like olefin polymers, having improved toughness. Accordingly, it is an object of this invention to provide such improved compositions and method and means to obtain the same. Other objects and advantages of this invention will become evident in the description that follows.

SUMMARY OF THE INVENTION

In accordance with this invention, compositions and products made therefrom having improved properties, especially as to tensile strength and toughness, are obtained by compounding thermoplastic polymers such as olefin polymer resins, especially high density polyethylene, with mineral fillers in the presence of trivinylisocyanurate, i.e., 1,3,5-trivinyl-s-triazine-2,4,6(1H,3H,5H)-trione, hereinafter abbreviated TVI, advantageously with a free-radical initiator, to form curable compositions and curing such curable compositions in the form of useful articles. The resin matrix of the cured products is advantageously crosslinked by function of the TVI whereby the resulting products also have improved resistance to stress cracking and other benefits of crosslinked molecular structure.

In the British Specification No. 1,195,214 noted hereinbefore, triallyl cyanurate is mentioned among many other unsaturated materials, but TVI is not suggested for any purpose.

In U.S. Pat. No. 3,817,851, Atchison and Sundquist describe crosslinking olefin polymers by applying high energy ionizing radiation to a mixture of the olefin polymer and TVI, wherein the TVI enhances the crosslinking reaction to the effect that a smaller dose of radiation produces a larger degree of crosslinking. Mention is made of the optional permissible presence of other additives, including fillers, but no recognition is made of any value of the use of TVI apart from enhanced radiation crosslinking with high energy ionizing radiation means, and highly filled compositions are not described.

In another aspect of the present invention, a shelf-stable curable composition is provided comprising an intimately blended mixture of an olefin polymer resin in powdered form, a filler, and TVI in which the TVI is absorbed on particles of thermoplastic styrene polymer resins.

In addition to its benefits on the physical and mechanical properties of cured filled polymer resin compositions and articles, TVI is advantageous in the making of curable and cured compositions and products in that it is relatively non-toxic, has low volatility and odor and is generally safe and non-objectionable in use.

DETAILED DESCRIPTION AND EMBODIMENTS

The improved curable compositions of the present invention are composed essentially or normally solid thermoplastic organic polymers, finely divided mineral fillers, and TVI. In general, the proportion of filler to polymer resin is in the range from 1:4 to 4:1, by weight. The concentration of TVI is generally in the range from about 0.1 to about 10, preferably from about 0.5 to about 5, weight percent based on the starting thermoplastic resin.

The starting thermoplastic polymers are preferably polymers of olefins such as ethylene, propylene, butene-1 and the like as homopolymers of such olefins, copolymers of two or more such olefins with each other, and copolymers of at least one such olefin with at least one other mono-ethylenically unsaturated monomer copolymerizable therewith. Such polymers and means for making them are well known. Polyethylene and polypropylene are commonly used olefin polymers, and high density polyethylene is particularly benefited by the present invention. Derivatives of such olefin polymers, such as chlorinated high density polyethylene, are also used advantageously.

The starting fillers are finely divided inorganic materials of natural or synthetic origin in the form of regular or irregular particles, platelets or fibrous pieces, which are normally non-reinforcing fillers, i.e., fillers which are not inherently reinforcing and which have not already been treated to render them reinforcing in the polymer resin starting material to the extent desired. Specific materials for illustration include various types and grades of calcium carbonate (whiting), mica, talc, wollastonite, kaolin and other clay minerals, other silicates, silica including diatomaceous earth, barium sulfate, barium carbonate, barium titanate, titanium dioxide, magnesium oxide, various iron oxides, ground glass fiber and the like, and mixtures of such fillers. The fillers are preferably of a fineness to pass a 100-mesh screen sieve (U.S. Standard Sieve Series) and more preferably have equivalent spherical diameter less than about 15 microns. In addition, the curable compositions can contain effective proportions of other conventional functional additaments such as colorants, flame retardants, cell-forming blowing agents, or the like provided these are selected in kind and amount not to interfere with the curing reaction, as more fully discussed hereinafter.

In obtaining the advantages of this invention, it is important that the starting resin and filler materials be selected so that the polymerization reactivity of the TVI in the resulting composition is not inhibited, e.g., by excessive antioxidant in the base resin or by the presence of inhibiting impurities in the filler or by other additives or influences. If preliminary tests indicate that polymerization of TVI does not proceed normally in the presence of a particular candidate starting resin or filler or other material, the offending material should be treated to remove the interfering substance or another material should be selected in its place.

If the starting materials are amenable to polymerization of TVI, a mixture thereof is prepared by any suitable means providing intimate blending of the ingredients. This can be done under conditions, e.g., using heat and mastication, such that the starting thermoplastic resin is heat plastified, the filler is dispersed therein, and the TVI is activated by heat to effect thermal polymerization thereof and curing of the composition. In the substantial absence of interfering influences, the reaction is substantially complete in a few minutes at temperature of about 190° C. On cooling, the resulting cured composition is found to be advantageously toughened in contrast to similar composition similarly processed but absent the TVI.

Alternatively, the starting materials can be intimately mixed under conditions such that the TVI is not activated to polymerize, e.g., the finely divided filler is intimately commingled with the starting resin also in finely divided powdered form and with TVI, in any order and by any mixing means, at lower temperature, e.g., normal room temperature, whereby an intimately mixed curable composition containing monomeric TVI is obtained. When such curable composition is subsequently processed, e.g., by heating, at elevated temperature to heat-plastify the starting resin and to activate thermal polymerization of the TVI, curing occurs; on cooling, the resulting cured composition is found to be advantageously toughened.

The curable mixture of starting resin, filler and TVI can also comprise one or more free-radical initiators to cause the polymerization and curing reactions to occur at lower temperature, to proceed at faster rate or greater completion, or partially to compensate for presence of small amounts of inhibitory constituents or influences, or to modify the properties of the resulting product, or for other reasons. Suitable free-radical initiators include organic peroxides and hydroperoxides usually used in proportion up to about 10 percent by weight based on the amount of TVI in the curable composition. The free-radical initiators are preferably ones which are substantially stable at temperatures up to about the heat-plastifying temperature of the thermoplastic resin component of the curable composition so that such compositions can be heat formed and shaped into useful articles before rapid curing occurs. For compositions that are to be heat-plastified and then shaped before curing is completed, initiators having half-life times of at least about 15 seconds at such temperature are preferred. Initiators having shorter half-life times at the curing temperature can be used if the molding or shaping step is substantially completed before the temperature of the curable composition reaches such curing temperature. Illustrative useable free-radical initiators include di-t-butyl diperphthalate, t-butyl peracetate, t-butyl perbenzoate, dicumyl peroxide, t-butyl hydroperoxide, di-t-butyl peroxide, p-menthane hydroperoxide, pinane hydroperoxide, cumene hydroperoxide, 2,5-dimethylhexane-2,5-dihydroperoxide, 2,5-dimethyl-2,5-di-t-butylperoxy-hexane, and 2,5-dimethyl-2,5-di-t-butylperoxy-hexyne-3.

The curable composition of starting thermoplastic resin, filler and TVI is fabricated into useful articles by conventional molding or shaping means and subjected to conditions effecting polymerization of the TVI and curing of the composition. Shaping of the starting thermoplastic curable composition at heat-plastifying temperature can be effected by extrusion, by roll milling, by injection molding, by compression molding or the like. It is desirable that the curable composition be shaped before curing occurs and maintained in substantially finished shape or form during at least the terminal major portion of the curing step. The advantages of this invention are decreased or lost if the cured composition is masticated or extensively worked mechanically after the curing reaction is completed.

It has also been found in regard to carrying out this invention that best results are obtained when the curing step is carried out with curable compositions in which monomeric TVI is apparently available at the interface between the polymer resin phase and the solid surface of the filler particles. Thus, for example, the beneficial results of this invention are not obtained when TVI is polymerized in or on a filler material prior to compounding such material into a thermoplastic olefin polymer resin. Likewise, the benefits of this invention are not obtained when TVI is polymerized in or on a starting olefin polymer resin before compounding the resin will filler. In some such instances, polymerization of the TVI in the resin causes crosslinking of the resin with loss of thermoplastic properties so that further compounding is difficult or causes degradation of the resin.

Moreover, even when an otherwise suitable curable composition of olefin polymer resin, filler and monomeric TVI is used, best results of curing such composition may not be obtained when it appears that the TVI is remote from the resin-filler interface. Thus, poor results may be obtained when the TVI is thoroughly absorbed into the polymer phase or into the interior of absorbent filler particles of the curable composition prior to curing.

In one group of preferred embodiments of this invention to obtain optimum benefits thereof in the light of the foregoing observations, the TVI is added to and thoroughly commingled with a composition of starting finely divided olefin polymer resin and starting filler immediately prior to shaping the resulting curable composition and curing the same as hereinbefore described.

In another group of preferred embodiments of this invention to obtain optimum benefits thereof, starting compositions of olefin polymer resins in finely divided form and fillers as hereinbefore described are provided in which the TVI is present in the form absorbed in particles of normally solid thermoplastic polymers of styrene. For instance, polystyrene beads (about 0.5 mm diam.) mixed with TVI in hexane swells and imbibes the TVI. Such beads, mixed with powdered polyethylene and filler, provides a stable blend composition which, on heat plastification and curing, results in beneficially toughened cured product. Other thermoplastic styrene polymers can be used in bead or finely divided form to imbibe TVI to form concentrates for advantageous use in accordance with this invention. Thus, shelf-stable premixed compositions of a starting olefin polymer resin in finely divided form and styrene polymer particles having imbibed TVI can be prepared and stored for later blending with filler. Alternatively, such premixed compositions also containing filler blended therewith can be prepared and stored for later processing into cured products. However, because of the reactive nature of TVI, it is not advisable to store such latent curable compositions at elevated temperatures or for more than a few months.

Not only are the physical and mechanical properties of the cured filler resin compositions and resulting products improved as a consequence of the presence of TVI in the curable compositions, but the polymer resin structure of the cured products is found to be desirably crosslinked. Crosslinking is measurable by determining the percent gel content and/or the swelling index of the cured material as described hereinafter. Particularly advantageous results are obtained when the gel content in such cured material is greater than about 20 percent by weight.

Curable compositions and cured products of this invention are fabricated into useful articles including tubing, pipe, sheet, structural shapes, containers and the like. When the curable compositions also contain cell-forming blowing agents, cellular foamed products are obtained.

The following examples illustrate the invention but are not to be taken as limiting its scope. Parts and percentages are by weight unless otherwise indicated or required by context.

EXAMPLE 1

Tests were made on compositions based on high density linear copolymer of ethylene with a small amount of butene-1, standard Melt Index about 0.3 decigram per minute, density about 0.945 g/cc, in powder bead form. Two kinds of commercial filler grade calcium carbonate materials were used, one having average particle size approximately 3 micron (herein called "fine" grade) and one having average particle size approximately 16 micron (herein called "coarse" grade).

The compositions were compounded on a set of conventional rubber compounding rolls comprising two counter-rotating cylindrical rolls with adjustable gap, each being independently heated internally with steam up to 230 psi gauge pressure. The starting ethylene polymer resin and filler, in proportion of 30 parts to 70 parts, respectively, were dry mixed as powders, then placed on the compounding rolls and milled until a smooth, heat-plastified sheet was obtained. The actual temperature of the milled sheet could not be accurately determined, but was substantially lower than that of the roll surfaces, which in turn was less than that of the steam within the rolls. In tests of compositions for control purposes, the sheet was then cut from the rolls. In tests of compositions containing TVI, that material was added a lttle at a time to the heat-plastified composition while the latter was still on the rolls, and milling was continued for minimum further time to mix the TVI intimately into the resulting composition, whereupon the sheet was then cut from the rolls.

Pieces of the so-compounded sheets were then compression molded between parallel platens in a press at 190° C for four minutes, and cooled to form plates having thickness in the order of 0.070 to 0.080 inch. Tensile test bar specimens were cut from the molded plates and tested in an instrumented tensile test machine having jaw separation rate of 0.1 inch per minute. Table I shows the results of such tests carried out in duplicate.

Table I

| Test No. | Filler (1) | TVI (2) | Test Bar (3) | Tensile (4) |
|---|---|---|---|---|
| 1.1a | Fine | nil | 180 × 75 | 926 |
| b | | | 180 × 75 | 1555 |
| 1.2a | Fine | 2% | 199 × 75 | 2982 |
| b | | | 182 × 75 | 3004 |
| 1.3a | Coarse | nil | 190 × 75 | 1053 |
| b | | | 190 × 75 | 1088 |
| 1.4a | Coarse | 1.7% | 195 × 75 | 1299 |
| b | | | 195 × 75 | 1333 |

Notes:
Tests Nos. 1.1 and 1.3 are controls, not exemplary of the invention.
(1) $CaCO_3$ filler grades.
(2) Concentration as percent of ethylene polymer constituent.
(3) Width and thickness in mils, i.e., inches × $10^3$, of test bar cross-section.
(4) Maximum tensile stress calculated as pounds per square inch of original cross-section.

Comparison of Tests 1.2 with Tests 1.1 (control) shows great improvement in the tensile strength of the polymer composition highly filled with filler when TVI is used in the composition. Comparison of Tests 1.4 with Tests 1.3 shows like improvement; in the case of Tests 1.4, the tensile bars showed considerably more elongation under stress than did the other test bars.

EXAMPLE 2

Tests were made on compositions similar to those of Example 1 except that the filler used throughout was a uniform blend of one part of the "fine" grade and two parts of the "coarse" grade calcium carbonate. The starting polymer resin was the same kind and the proportion of filler to resin (70:30 parts, respectively) was the same as used in Example 1. The same compounding and test procedures were employed as in Example 1 except that the concentration of TVI was varied as indicated in Table II which also shows the results of such tests. Replicate tests were run as indicated.

Table II

| Test No. | TVI (2) | Test Bars (3) | Tensile (4) | Remarks (5) |
|---|---|---|---|---|
| 2.1a | nil | 165 × 80 | 1326 | |
| b | | 175 × 80 | 1214 | |
| c | | 185 × 80 | 1081 | |
| 2.2a | 0.63% | 185 × 77 | 2562 | Jaw |
| b | | 182 × 75 | 1612 | |
| c | | 200 × 78 | 1891 | Jaw |
| 2.3a | 2.4% | 215 × 75 | 3225 | |
| b | | 215 × 75 | 3039 | slip |
| c | | 215 × 75 | 3132 | Jaw |
| 2.4a | 5.5% | 200 × 70 | 3000 | |

Table II-continued

| Test No. | TVI (2) | Test Bars (3) | Tensile (4) | Remarks (5) |
|---|---|---|---|---|
| | b | 200 × 70 | 3429 | |

Notes:
Tests 2.1 are controls, not exemplary of the invention.
(2) Concentration as percent of ethylene polymer constituent.
(3) Width and thickness in mils, i.e. inches × $10^3$, of test bar cross-section.
(4) Maximum tensile stress calculated as pounds per square inch of original cross-section.
(5) In Tests 2.2a, 2.2c, and 2.3c, the bar broke at the jaw. In Test 2.3b, the bar slipped from the jaw.

While there are some variations in the test values of replicate specimens, there is clear evidence in these data of beneficial results in highly filled polymer compositions of the use of TVI in accordance with this invention.

EXAMPLE 3

In this example, equal parts of isotactic polypropylene and the "coarse" grade of calcium carbonate described in Example 1 were compounded with and without TVI and tested in a manner similar to that described in Example 1 with results shown in Table III.

Table III

| Test No. | TVI (2) | Test Bars (3) | Tensile (4) |
|---|---|---|---|
| 3.1a | nil | 185 × 70 | 2394 |
| b | | 185 × 70 | 2394 |
| 3.2a | 2% | 185 × 70 | 3166 |
| b | | 185 × 70 | 2703 |

Notes:
Tests 3.1 are controls, not exemplary of the invention.
(2) Concentration as percent of polypropylene constituent.
(3) Width and thickness in mils, i.e. inches × $10^3$, of test bar cross-section.
(4) Maximum tensile stress calculated as pounds per square inch of original cross-section.

EXAMPLE 4

In these tests, 50 parts of milled glass fiber was used as filler in 100 parts of the ethylene polymer resin described in Example 1 with 1.6% TVI based on the ethylene polymer resin. The compositions were compounded, molded and tested in the manner described in Example 1 with results shown in Table IV.

Table IV

| Test No. | TVI (2) | Test Bars (3) | Tensile (4) |
|---|---|---|---|
| 4.1a | nil | 195 × 70 | 4542 |
| b | | 195 × 70 | 4615 |
| 4.2a | 1.6% | 190 × 70 | 5338 |
| b | | 190 × 70 | 5564 |

Notes:
Tests No. 4.1 are controls, not exemplary of the invention.
(2) Concentration as percent of ethylene polymer constituent.
(3) Width and thickness in mils, i.e. inches × $10^3$, of test bar cross-section.
(4) Maximum tensile stress calculated as pounds per square inch of original cross-section.

EXAMPLE 5

Equal parts of ethylene polymer of the kind described in Example 1 and diatomaceous earth having only 0.1% retained on 325 mesh screen (U.S. Standard Sieve) were compounded with heat in a Brabender mixer, and to a portion thereof was added TVI in amount 1% of the ethylene polymer and 2,5-dimethyl-2,5-di-t-butyl-peroxy-hexyne-3 in amount 0.15% of the ethylene polymer. The compositions were compression molded between flat platens at 190° C for 4 minutes to form sheets. Tensile test bars were cut from the cooled sheets and tested in conventional manner with results shown in Table V.

The molded compositions were also tested to measure the gel content and swelling index of the polymer phase. In these tests, a small portion of each sample was weighed (Sample weight) and placed in about 20-fold excess xylene. After boiling the xylene for several hours under reflux, the hot liquor was poured off the remaining insoluble material which was then weighed (Wet weight). The wet material was dried in vacuum at 60° C and again weighed (Dry weight). Finally, the dried sample was ignited to burn off the organic polymer and leave the residual filler which was weighed (Residue weight). From these data, calculations were made as follows:

$$\text{Gel \%} = \frac{\text{Dry weight} - \text{Residue weight}}{\text{Sample wgt.} \times \text{\% polymer in sample}} \times 100$$

$$\text{Swell Index} = \frac{\text{Wet weight} - \text{Residue weight}}{\text{Dry weight} - \text{Residue weight}} - 1$$

These values are also shown in Table V.

Table V

| Test No. | TVI | Tensile, Break | | | Gel % | Swell Index |
|---|---|---|---|---|---|---|
| | | Psi | Elong. % | Work | | |
| 5.1 | nil | 1841 | 13.3 | 322 | 4.2 | 9. |
| 5.2 | 1% | 3483 | 4.8 | 124 | 58.3 | 4.76 |

Notes:
Test 5.1 is a control, not exemplary of the invention. Tensile values are averages of several replicates. Break work values are inch-pounds per cubic inch.

While the gel and swell index values of Test 5.1 indicate that some kind of crosslinking seems to occur to a small extent in ethylene polymer compositions with diatomaceous earth alone, the values in Test 5.2 show that TVI effects considerable greater extent of crosslinking. It was further observed that the sample piece of molding in Test 5.2 retained almost perfectly its geometric shape and proportions during extraction in boiling xylene, and the dried extracted piece had a leathery appearance and feel.

Variations

The tests of Example 1 were repeated with variations. In one series, the TVI was diluted in methylene chloride and sprayed onto the powdered ethylene polymer resin material. After standing overnight and vaporization of the methylene chloride, the resin and filler were roll compounded, compression molded and tested with results substantially like those obtained in Example 1 with like compositions. However, when the powdered resin-TVI mixture was stored for one month before compounding with filler, molding and testing, only marginal improvement in tensile properties was obtained over the control without TVI. In another variation, when a "dry" mixture of powdered resin, filler and TVI was compression molded without prior mill mixing, a satisfactory product was not obtained. In other tests, it was found that some lots or batches of filler, especially commercial shipments of "fine" grade calcium carbonate filler, were inhibitory and others were catalytic in regard to their influence on the rate of polymerization of TVI and curing of the curable compositions of resin, TVI and such fillers. Accordingly, the optimum processing times to obtain the benefits of this invention were correspondingly affected.

EXAMPLE 6

In these tests, the TVI was first absorbed on styrene polymer particles by mixing 2.73 parts of TVI with 13 parts of n-hexane and adding 6 parts of polystyrene beads having diameter about 0.5 mm. The polystyrene beads swelled and imbibed the TVI and hexane. After the n-hexane had evaporated, the resulting beads containing TVI were mixed with 205 parts of powdered ethylene polymer resin of the kind described in Example 1, and the mixture was stored. After a month of storage, 100-part portions of the mixture were individually mixed with calcium carbonate fillers of kinds and amounts as hereinafter indicated, and the filled compositions were mill compounded, compression molded and tested in the manner described in Example 1 with results as shown in Table VI. The tensile values are averages of several replicates. For comparison, compositions of the same ethylene polymer resin powder and filler, absent the polystyrene-TVI beads, were similarly prepared, molded and tested.

Table VI

| Test No. | TVI | Filler Type(1) | Parts(2) | Tensile psi |
|---|---|---|---|---|
| 6.1 | absent | B | 230 | 1200 |
| 6.2 | present | B | 230 | 2900 |
| 6.3 | absent | C | 150 | 1500 |
| 6.4 | present | C | 150 | 2600 |
| 6.5 | absent | C | 230 | 1100 |
| 6.6 | present | C | 230 | 2200 |

Notes:
Test 6.1, 6.3 and 6.5 are controls, not exemplary of the invention.
(1) Filler type B is a calcium carbonate filler of "coarse" type described in Example 1, having average particle size approximately 16 micron. Filler type C is a blend of two parts of filler type B with one part of a synthetic calcium carbonate filler having crystalline structure and very fine particle size approximately 2 micron.
(2) Parts of filler per 100 parts of the resin constituent.

EXAMPLE 7

In this example, a chlorinated high density polyethylene, hereinafter CPE, containing 37% combined chlorine and free or antioxidant was compounded with the "coarse" grade of calcium carbonate filler used in Example 1 in proportion as indicated hereinafter, with and without TVI. The compositions were mill-compounded, compression molded and tested in the manner described in Example 1, with results as shown in Table VII.

Table VII

| Test No. | Composition, parts CPE | CaCO₃ | TVI | Tensile, yield Psi | Elong. % | Tensile, Break Psi | Elong. % | Modulus Psi × 10⁻³ |
|---|---|---|---|---|---|---|---|---|
| 7.1 | 30 | 70 | nil | 619 | 7.7 | 511 | 125 | 21 |
| 7.2 | 30 | 70 | 1 | 658 | 7.7 | 521 | 85 | 28 |
| 7.3 | 30 | 60 | nil | 562 | 12.3 | 537 | 155 | 13 |
| 7.4 | 30 | 60 | 1 | 763 | 17.5 | 757 | 55 | 20 |

Notes:
Tests Nos. 7.1 and 7.3 are controls, not exemplary of the invention. In Tests 7.1 and 7.2, the concentration of filler apparently exceeded the wetting capacity of the ethylene polymer resin phase.

EXAMPLE 8

In these tests, a commercial chlorinated polyethylene (CPE) elastomer was compounded with the usual compounding agents and by usual procedure. For illustrating this invention, various amounts of TVI were included in some tests. For purpose of comparison, one test was also run with the addition of triallylisocyanurate, i.e., 1,3,5-triallyl-s-triazine-2,4,6(1H,3H,5H)-trione. The complete formulations are shown in Table VIII A. The compositions were mixed in a Banbury mixer, molded and cured for 30 minutes at 330° F (166° C), and tested by standard ASTM test methods to determine the following properties:
1. Tensile, modulus, and elongation by ASTM D 412-68
2. Compression Set by ASTM D 395 method B
3. Curing characteristics by ASTM D1646 and ASTM D 2084
4. Hardness by ASTM D 2240
5. Tear Strength by ASTM D 624.

Results are shown in Table VIII B.

Table VIII A
FORMULATIONS

| Components | Tests 8.1 | 8.2 | 8.3 | 8.4 | 8.5 |
|---|---|---|---|---|---|
| CPE | 100 | 100 | 100 | 100 | 100 |
| Basic silicate of white lead | 10 | 10 | 10 | 10 | 10 |
| Carbon black | 145 | 145 | 145 | 145 | 145 |
| Chlorinated paraffin wax | 50 | 50 | 50 | 50 | 50 |
| Triallylisocyanurate (TAIC) | 1 | — | — | — | — |
| Trivinylisocyanurate (TVI) | — | — | 1 | 2 | 0.5 |
| Dicumyl peroxide | 10 | 10 | 10 | 10 | 10 |

Notes:
Test 8.2 is a control, and Test 8.1 is for comparison; Tests 8.3–8.5 are exemplary of the present invention. Compositions are in parts by weight.

Table VIII B

| | Tests 8.1 | 8.2 | 8.3 | 8.4 | 8.5 |
|---|---|---|---|---|---|
| 100% Modulus, psi | 890 | 630 | 1015 | 1100 | 760 |
| 200% Modulus, psi | 1760 | 1450 | 1970 | 1940 | 1755 |
| Tensile Strength Ultimate, psi | 1900 | 1750 | 2100 | 1975 | 1925 |
| Elongation, % | 250 | 300 | 210 | 200 | 250 |
| Hardness, Shore A | 71 | 69 | 73 | 74 | 70 |
| Tear Strength, Type C, ppi | 160 | 185 | 150 | 145 | 160 |
| Compression Set, Method B, % | 43.8 | 50.7 | 39.0 | 39.5 | 44.6 |
| Mooney Viscosity Ml 1+4/212° F | 88 | 89 | 90 | 86 | 88 |
| Scorch (Δ5) 250° F, min. | >25 | >25 | 8 | 5 | 25 |
| High Temp. Physicals, 300° F, Tensile Strength, psi | 655 | 605 | 670 | 705 | 665 |
| Elongation, % | 180 | 215 | 135 | 130 | 160 |

It appears from these tests that 1–2 parts of TVI per 100 parts CPE (Tests 8.3 and 8.4) are optimum in compositions of this kind and these conditions of cure to obtain best values of modulus, ultimate tensile strength and compression set. By comparison with Test 8.1, these values are unexpectedly superior to those obtained using TAIC.

By practice of the present invention in improved curable compositions, method of curing and resulting cured compositions, useful articles are obtained in the form of pipe, tubing and other extruded shapes, sheets and molded articles which are improved particularly as to strength and toughness.

What is claimed is:

1. In a curable composition consisting essentially of a normally solid thermoplastic olefinic polymer resin, a normally non-reinforcing finely divided inorganic filler in proportion by weight from 1:4 to 4:1 to the polymer resin, and an ethylenically unsaturated material polymerizable under free-radical initiation to effect curing of the composition, the improvement wherein the ethylenically unsaturated material is trivinylisocyanurate and wherein the trivinylisocyanurate is imbibed on particles of solid thermoplastic polymer of styrene.

2. The improvement of claim 1 wherein the starting polymer resin is a polymer of ethylene.

3. The improvement of claim 1 wherein the starting polymer resin is a high density polyethylene.

4. The improvement of claim 1 wherein the starting polymer resin is a chlorinated polyethylene.

5. The improvement of claim 1 wherein the trivinylisocyanurate is imbibed on particles of polystyrene.

6. The improvement of claim 1 wherein the trivinylisocyanurate is present in amount from about 0.1 to about 10 percent by weight based on the starting resin.

7. In a method wherein a curable composition consisting essentially of a normally solid thermoplastic olefinic polymer resin, a normally non-reinforcing finely divided inorganic filler in proportion by weight from 1:4 to 4:1 to the polymer resin, and an ethylenically unsaturated material polymerizable under free-radical initiation is subjected to conditions initiating free-radicals, the improvement wherein the ethylenically unsaturated material is trivinylisocyanurate which is imbibed on particles of solid thermoplastic polymer of styrene.

8. A cured composition obtained by the method and improvement of claim 7.

9. The improvement of claim 7 wherein the starting polymer resin is a polymer of ethylene.

10. A cured composition obtained by the method and improvement of claim 9.

* * * * *